(No Model.) 2 Sheets—Sheet 1.

O. M. MORSE.
BELT GEARING.

No. 326,670. Patented Sept. 22, 1885.

Witnesses:
Chas. J. Buchheit
Theo. L. Popp

O. M. Morse Inventor
By Wilhelm & Bonner
Attorneys.

(No Model.) 2 Sheets—Sheet 2.

O. M. MORSE.
BELT GEARING.

No. 326,670. Patented Sept. 22, 1885.

UNITED STATES PATENT OFFICE.

ORVILLE M. MORSE, OF JACKSON, MICHIGAN, ASSIGNOR TO THE KNICKERBOCKER COMPANY, OF SAME PLACE.

BELT-GEARING.

SPECIFICATION forming part of Letters Patent No. 326,670, dated September 22, 1885.

Application filed January 17, 1885. (No model.)

*To all whom it may concern:*

Be it known that I, ORVILLE M. MORSE, of the city of Jackson, in the county of Jackson and State of Michigan, have invented new and useful Improvements in Belt-Gearing, of which the following is a specification.

This invention relates to an improvement in that class of gearing in which endless belts provided with sprockets or teeth are employed in connection with wheels or pulleys having openings or recesses in which the sprockets of the belts engage. Heretofore these belt-gearings have not been practical, because the belts, which are constructed of leather, rubber, or canvas, or other flexible material, stretch more or less in use, and not uniformly in different parts of the belt, owing to inequalities in the degree of flexibility of different portions of the same belt and other causes, whereby the spaces between the sprockets become unequal. These changes in the belt cause the sprockets to get out of register with the openings or recesses in the wheels, whereby the sprockets are caused to mount the wheels and the belt to run off the wheels. To avoid these difficulties, drive-chains are employed; but these chains can only be used at comparatively slow speeds.

The object of my invention is to provide a sprocket-belt gearing in which the above-mentioned difficulties are overcome; and my invention consists to that end of the improvements which will be hereinafter fully described, and pointed out in the claims.

Figure 1:
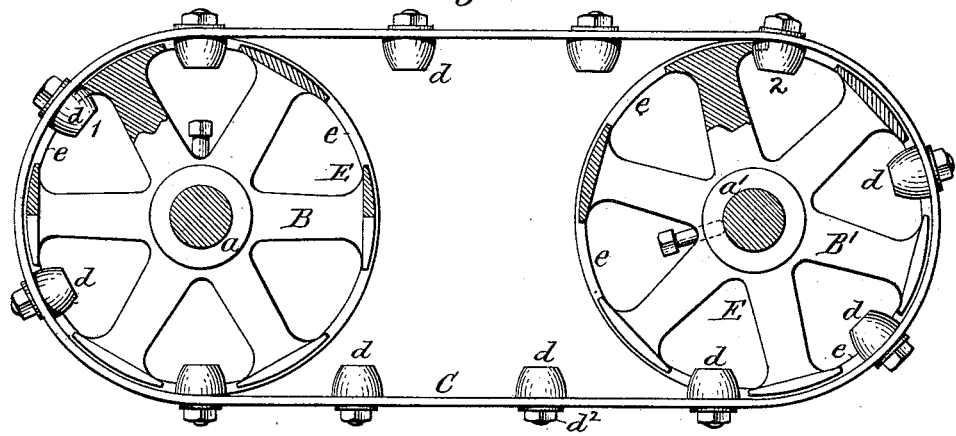
Figure 2:
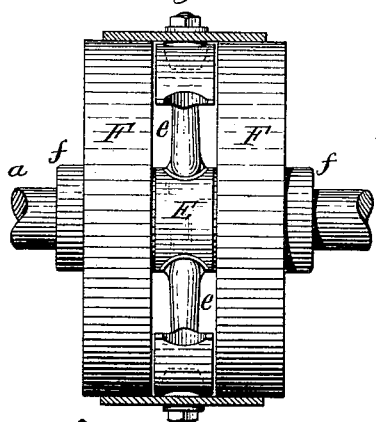
Figure 3:
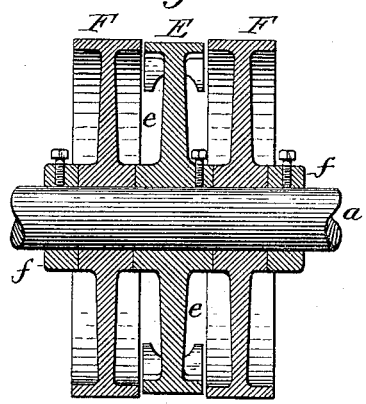
Figure 4:
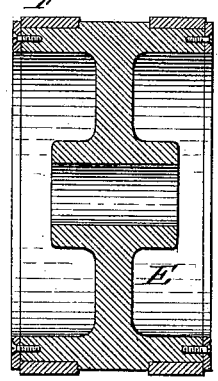
Figure 5:
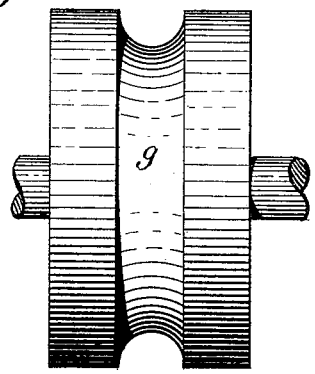
Figure 6:
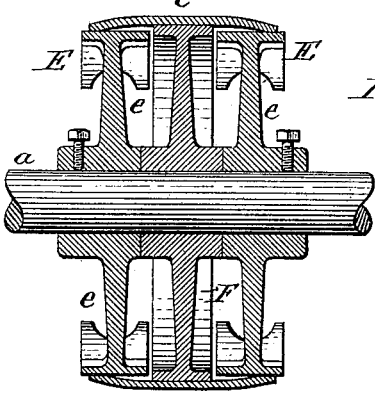
Figure 7:
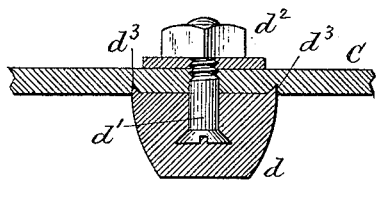
Figure 8:
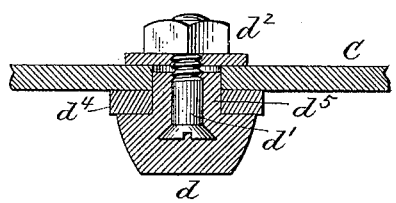
Figure 9:
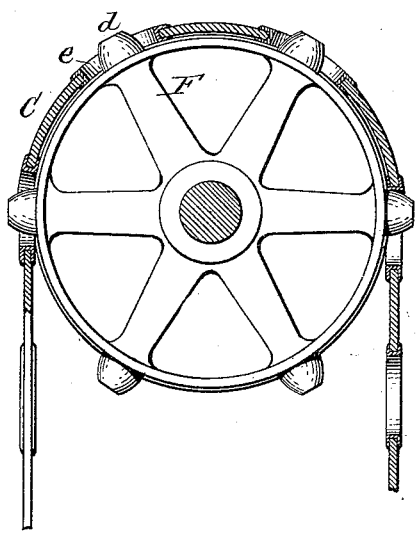

In the accompanying drawings, consisting of two sheets, Figure 1 is a partly sectional side elevation of my improved belt-gearing. Fig. 2 is a face view of one of the pulleys. Fig. 3 is a sectional elevation of the same. Fig. 4 is a sectional elevation showing a modified construction of the pulley. Fig. 5 is a face view of a supporting-pulley. Fig. 6 is a sectional view showing a modified form of my improvement. Figs. 7 and 8 are sectional views showing the constructions of the sprockets. Fig. 9 is a sectional side elevation, and Fig. 10 a face view showing a modified construction of the gearing.

Like letters of reference refer to like parts in the several figures.

$a\ a'$ represent two shafts, B B' the pulleys mounted on the same, and C the endless sprocket-belt arranged around said pulleys.

$d$ represents the sprockets secured to the belt C, and having approximately the form of truncated cones, whereby the entrance and exit of the sprockets into and from the openings or recesses of the pulleys are facilitated.

The sprockets $d$ are preferably constructed of cast-iron and provided with screw-shanks $d'$, which penetrate the belt C and carry screw-nuts $d^2$, whereby the sprockets are secured to the belt. The sprockets may be provided at their bases with teeth $d^3$, as represented in Fig. 7, which enter the belt and relieve the fastening-bolt to a large extent from the working strain; or the base of the sprocket may be provided with a V-shaped annular ring for the same purpose.

$d^4$ represents a washer, of leather or other sound-deadening material, interposed between the sprocket and the belt in such a position that the washer will come in contact with the pulley first and will receive the impact of the parts and deaden the sound. The sprocket is preferably formed with a sleeve, $d^5$, which surrounds the fastening-bolt and affords a large bearing-surface for the sprocket on the belt.

The pulleys B B' consist each of a central sprocket-wheel, E, and two pulleys, F F, arranged on both sides of the wheel E. The latter is secured to the shaft $a$ and provided in its periphery with spaces, recesses, or openings $e$, in which the sprockets $d$ engage. The side pulleys, F, turn loosely on the shaft $a$, and are held against lateral displacement by collars $f$. The faces of the side pulleys, F, project slightly beyond the face of the sprocket-wheel E, to relieve the latter as much as possible from the friction of the belt. This would be accomplished to a certain extent when the faces of the pulleys F and the wheel E are flush, as the belt does not find the same bearing on the face of the sprocket-wheel, which is partly cut away to make room for the sprockets; but I prefer to further relieve the sprocket-wheel by raising the faces of the side pulleys, so that the sprocket-wheel comes in contact with the sprockets only and not with the belt. The side pulleys, F, turn on the shaft independently of the sprocket-wheel, and run with the same speed as the belt, while the sprocket-wheels E adapt themselves to the irregularities in the spaces between the sprockets, if any exist. For instance, in Fig. 1, B represents the driving-pulley, turning in the direction of the arrow, and B' represents the driven pulley. The spaces between the sprockets $d$ are shown to be so irregular that only the sprocket marked 1 is seized by the wheel E of the driving-pulley, and this sprocket communicates the motion of the wheel to the belt. When this sprocket leaves the wheel on the under side of the pulley B, the motion of the side pulleys, F, and belt C are retarded, because the motive power is momentarily disconnected from the belt until the sprocket-wheel has advanced far enough to engage another sprocket. The distance which the sprocket-wheel travels in this manner before it overtakes another sprocket is of course small; but this differential movement of the sprocket-wheel and side pulleys is sufficient to compensate for the irregularities of the sprockets, and serves to maintain the parts in a working position, while in the absence of this differential movement the sprockets would mount the wheel E under these circumstances. In the driven pulley B' a similar irregularity of the sprockets is illustrated. In this pulley only the sprocket marked 2 is engaged with the wheel E and transmits motion to the wheel. When this sprocket leaves the wheel, the motion of the latter is retarded, owing to the temporary absence of motive power, while the side wheels, F, move on under the friction of the belt until the belt has advanced so far that another sprocket engages against the wheel E. The openings or spaces $e$ in the wheels E are made so long as to give ample play to the sprockets and provide for the greatest possible variations in the spaces between the sprockets.

Instead of mounting the belt-supporting wheels F on the shaft, as represented in Figs. 1, 2, and 3, they may be constructed in the form of rings mounted loosely on the sprocket-wheel E, as represented in Fig. 4.

When the device is employed in a bucket-elevator or any other construction in which only one pulley is required to be geared with the belt while the other pulley merely supports and guides the belt, the supporting-pulley is constructed with an annular depression or groove, $g$, through which the sprockets pass freely, as represented in Fig. 5.

Figure 10:
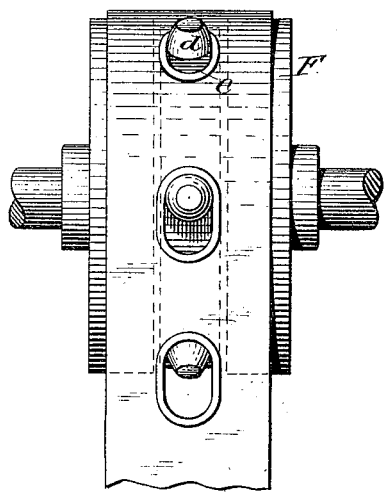

It is obvious that the relative arrangement of the sprockets and openings may be reversed by forming the sprockets on the wheels E E and the openings in the belt, as represented in Figs. 9 and 10.

My improved belt-gearing can be operated at comparatively high speeds, like ordinary belt-gearing, and transmits motion from the pulley to the belt, or vice versa, in a positive and reliable manner.

The belt also forms a convenient and durable support for elevator buckets, drags, and similar devices.

If it should be desired to provide the belt with two rows of sprockets, two sprocket-wheels, E E, and an intermediate belt-supporting wheel, F, may be employed, as represented in Fig. 6.

I claim as my invention—

1. The combination, with a wheel which is positively geared with a belt, of belt-supporting wheels capable of independent rotative movement with reference to the geared wheel, substantially as set forth.

2. The combination of a sprocket-wheel and belt supporting rings capable of differential rotative movement with reference to each other, substantially as set forth.

3. The combination of a sprocket-wheel and belt-supporting rings arranged side by side, with the face of the belt-supporting ring projecting beyond the face of the sprocket-wheel, substantially as set forth.

4. The combination, with a shaft, $a$, of a sprocket-wheel, E, secured to said shaft, and belt-supporting pulleys mounted loosely on said shaft, substantially as set forth.

5. The combination, with a belt, of metallic sprockets provided with sound-deadening washers, substantially as set forth.

6. The combination, with a sprocket-wheel, E, and belt-supporting rings F, capable of differential rotative movement, of an endless belt, C, provided with sprockets $d$, having approximately the form of truncated cones, substantially as set forth.

7. The combination, with a belt, of a sprocket, $d$, provided with a sleeve, $d^3$, fastening-bolt $d'$, and sound-deadening washer $d^4$, substantially as set forth.

Witness my hand this 7th day of January, 1885.

O. M. MORSE.

Witnesses:
EDWARD WILHELM,
C. F. GEYER.